(No Model.)

J. I. ROBERTS & J. B. McCORMICK.
BOILER SCRAPER.

No. 569,060. Patented Oct. 6, 1896.

Witnesses.
A. S. Hoge
F. D. Johns

Inventors.
John I. Roberts
Joseph B. McCormick
per Leroy B. Hills
Attorney.

UNITED STATES PATENT OFFICE.

JOHN I. ROBERTS AND JOSEPH B. McCORMICK, OF GRANVILLE, NEW YORK.

BOILER-SCRAPER.

SPECIFICATION forming part of Letters Patent No. 569,060, dated October 6, 1896.

Application filed November 23, 1895. Serial No. 569,920. (No model.)

*To all whom it may concern:*

Be it known that we, JOHN I. ROBERTS and JOSEPH B. McCORMICK, citizens of the United States, residing at Granville, in the county of Washington and State of New York, have invented certain new and useful Improvements in Boiler-Scrapers, of which the following is a specification.

Our invention relates to devices for removing scale and other incrustation from the interiors of boilers, and has for its objects to provide a novel device having a wide scraping-blade that can be readily turned so as to be easily inserted through the ordinary manhole of a boiler and then turned back and firmly retained in its operative position ready for use within the boiler. These objects we accomplish in the manner and by the means hereinafter described and claimed, reference being had to the accompanying drawings, in which—

Figure 1:
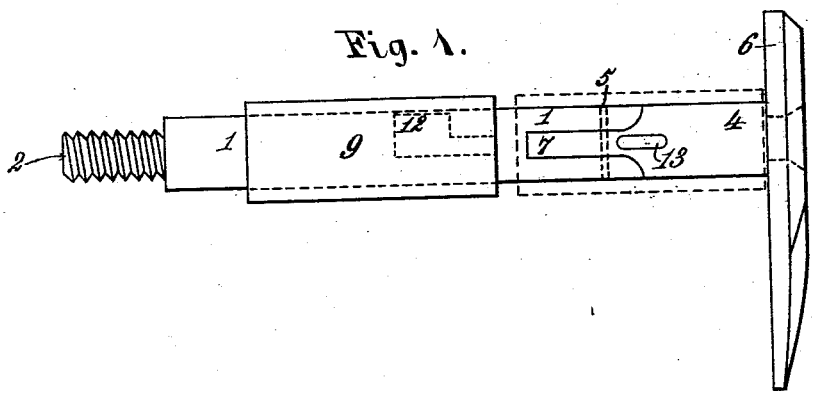
Figure 2:
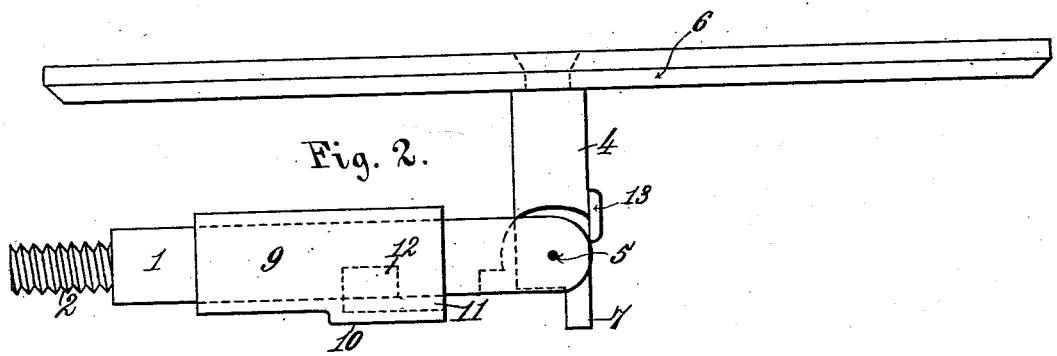
Figure 3:
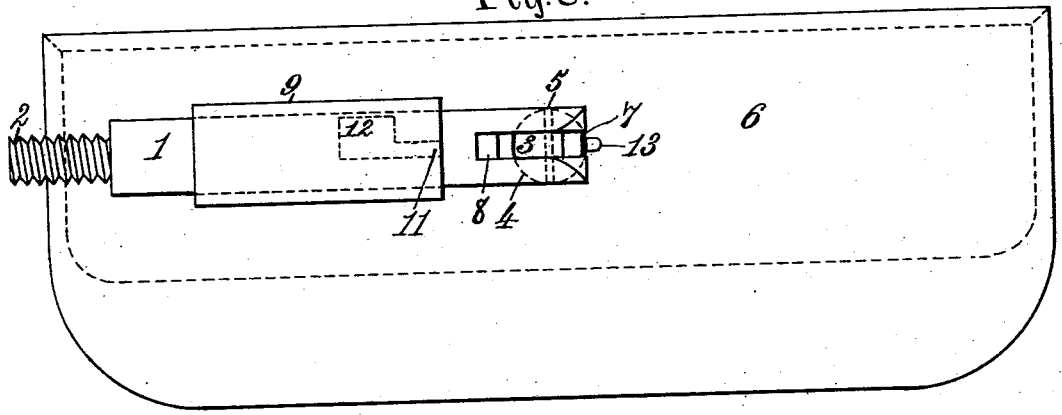

Figure 1 is a side elevation of our improved device, the scraper-blade being in position for use. Fig. 2 is a top plan view showing the scraper-blade turned ready for insertion through the boiler-manhole, and Fig. 3 is a side elevation showing the scraper in a position similar to Fig. 2.

In the said drawings the numeral 1 denotes the shank of the device, preferably formed with a screw-threaded end 2, to which may be attached a suitable handle. At its other end the shank 1 is rounded and bifurcated, as shown, to receive the small end 3 of a stem 4, pivoted thereto by the pivot-pin 5, and to which is firmly attached at its outer end the scraper-blade 6, of substantially the shape shown. The small end 3 of the stem 4 is provided with the projecting tongue 7, adapted to come in contact with a shoulder 8 in the bifurcated end of the shank, and thus prevent the stem 4 from being turned on its pivot in but one direction.

Sliding on the shank 1 is a sleeve 9, having a thickened portion 10 on one side at its front end to provide room for a recess 11, opening from the front end of the sleeve and enlarged to one side at its rear end into a chamber 12. This recess and chamber are for the purpose of permitting the passage thereinto of a projection 13, formed on one side of the stem 4, as the sleeve is slid along toward the scraper-blade 6 when the shank 1 and stem 4 are in alinement. Instead of having the thickened portion 10, however, the sleeve 9 may, if desired, be made thick enough throughout its whole area to permit of the formation therein of the recess 11 and chamber 12.

The operation of our device will now be understood to be as follows: When it is desired to insert the implement through the ordinary manhole of a boiler, the sleeve 9 is slid back to the position shown in full lines in the figures, and the stem 4, with its attached scraper-blade 6, turned on the pivot-pin 5 to the position shown in Figs. 2 and 3, when by reason of the fact that the breadth of the scraper-blade is less than the diameter of the manhole the device can be readily inserted therethrough into the interior of the boiler. When once inside the boiler, the stem 4 is turned into alinement with the shank 1 and the sleeve 9 slid along the two until the projection 13, passing into recess 11, reaches the rear end thereof. The sleeve is now rotated to bring said projection into the chamber 12, which will retain said sleeve in its adjusted position, as shown in dotted lines in Fig. 1. It will thus be seen that the sleeve will completely cover the pivot-point of connection between the shank and stem and will firmly retain the two parts in alinement. A handle of any suitable length may now be screwed onto the end 2 of the shank, and the device will be ready for use.

Having thus described our invention, what we claim as new, and desire to secure by Letters Patent, is—

1. In a boiler-scraper, the combination with a shank, a scraper-blade, and a stem fixed to said blade and pivoted to said shank, of a sleeve slidable on said shank and stem, and means for locking said sleeve in its forward position to retain the shank and stem in alinement, substantially as described.

2. In a boiler-scraper, the combination with a shank, a scraper-blade, and a stem fixed to said blade and pivoted to said shank, of a sleeve slidable on said shank and stem, and having a recess and chamber in its front end into which a projection on the stem is adapted to enter as the sleeve is moved forward, to lock the same in its forward position and thus retain the shank and stem in alinement, substantially as described.

In testimony whereof we affix our signatures in the presence of two witnesses.

JOHN I. ROBERTS.
JOSEPH B. McCORMICK.

Witnesses:
W. D. TEMPLE,
H. H. SEARLES.